(12) United States Patent
Wolf et al.

(10) Patent No.: US 10,100,707 B2
(45) Date of Patent: Oct. 16, 2018

(54) ACTIVE GRILLE SHUTTER AND SHUTTER SUBASSEMBLY FOR USE WITH ACTIVE GRILL SHUTTERS

(71) Applicant: Montaplast of North America, Inc., Auburn Hills, MI (US)

(72) Inventors: Robert Wolf, Auburn Hills, MI (US); Wolfgang Kern, Auburn Hills, MI (US); Sascha Klausen, Auburn Hills, MI (US)

(73) Assignee: Montaplast of North America, Inc., Auburn Hills, MI (US)

( * ) Notice: Subject to any disclaimer, the term of this patent is extended or adjusted under 35 U.S.C. 154(b) by 0 days.

(21) Appl. No.: 15/443,255

(22) Filed: Feb. 27, 2017

(65) Prior Publication Data

US 2017/0248066 A1    Aug. 31, 2017

Related U.S. Application Data

(60) Provisional application No. 62/301,310, filed on Feb. 29, 2016.

(51) Int. Cl.
*F01P 7/10* (2006.01)
*B60K 11/08* (2006.01)

(52) U.S. Cl.
CPC .............. *F01P 7/10* (2013.01); *B60K 11/085* (2013.01); *Y02T 10/88* (2013.01)

(58) Field of Classification Search
CPC ... B60K 11/085; B60K 2700/00; B60R 19/52; B60R 2019/486
See application file for complete search history.

(56) References Cited

U.S. PATENT DOCUMENTS

| 1,443,978 A | 2/1923 | Carter |
| 1,501,933 A | 7/1924 | Wilson |

(Continued)

FOREIGN PATENT DOCUMENTS

| FR | 2972392 A1 | 9/2012 |
| FR | 2992590 A1 | 1/2014 |

OTHER PUBLICATIONS

Communication issued Jul. 25, 2017 enclosing the European Search Report dated Jul. 13, 2017 for European Patent Application No. 17158308.1 (10 pages).

*Primary Examiner* — Long T Tran
(74) *Attorney, Agent, or Firm* — Howard & Howard Attorneys PLLC

(57) ABSTRACT

An active grille shutter for regulating airflow towards a vehicle heat exchanger. A frame adjacent the heat exchanger has a first mount with bores, a second mount, and an opening between the mounts to allow air to pass through. An end cap secures to the second mount and has bores. Vanes extend across the opening between opposing ends with a receiver at each end. Bearings are provided with couplers extending into and attached to the receivers, and a shafts extending into the bores. A linkage interconnects the bearings at one of the ends such that the vanes rotate concurrently. An actuator attached to the frame adjacent the first mount is coupled to one of the end cap bearings and rotation imparts rotation to the vanes by the linkage to concurrently rotate the vanes within the opening to regulate airflow through the opening towards the heat exchanger.

14 Claims, 15 Drawing Sheets

(56) References Cited

U.S. PATENT DOCUMENTS

| | | |
|---|---|---|
| 1,523,541 A | 1/1925 | Irving |
| 1,542,407 A | 6/1925 | Raleigh |
| 1,576,507 A | 3/1926 | Eliasek |
| 1,619,621 A | 3/1927 | Lovejoy |
| 1,772,722 A | 8/1930 | Kinnard |
| 3,115,223 A | 12/1963 | Shustrom |
| 3,759,056 A | 9/1973 | Graber |
| 4,457,558 A | 7/1984 | Ishikawa |
| 5,921,028 A | 7/1999 | Marocco |
| 6,508,506 B2 | 1/2003 | Ozawa et al. |
| 7,044,517 B2 | 5/2006 | Hyuga |
| 7,374,220 B2 | 5/2008 | Ichimaru |
| 7,887,125 B2 | 2/2011 | Tazaki et al. |
| 7,942,223 B2 | 5/2011 | Obayashi et al. |
| 8,136,487 B2 | 3/2012 | Bernt et al. |
| 8,505,660 B2 | 8/2013 | Fenchak et al. |
| 8,561,739 B2 | 10/2013 | Hori |
| 8,640,802 B2 | 2/2014 | Schneider |
| 8,646,552 B2 | 2/2014 | Evans et al. |
| 8,708,077 B2 * | 4/2014 | Hori ............... B60K 11/085 180/68.1 |
| 8,827,233 B2 | 9/2014 | Crane et al. |
| 8,973,607 B2 | 3/2015 | Schwarz et al. |
| 9,233,605 B2 | 1/2016 | Hijikata |
| 2009/0266633 A1 | 10/2009 | Obayashi et al. |
| 2009/0266634 A1 | 10/2009 | Obayashi et al. |
| 2010/0236503 A1 | 9/2010 | Bernt et al. |
| 2010/0243352 A1 | 9/2010 | Watanabe et al. |
| 2011/0226541 A1 | 9/2011 | Hori et al. |
| 2011/0232981 A1 | 9/2011 | Hori et al. |
| 2012/0012410 A1 | 1/2012 | Hori |
| 2012/0019025 A1 | 1/2012 | Evans et al. |
| 2012/0060776 A1 | 3/2012 | Charnesky et al. |
| 2012/0074729 A1 | 3/2012 | Fenchak et al. |
| 2012/0110909 A1 | 5/2012 | Crane et al. |
| 2012/0119059 A1 | 5/2012 | Crane et al. |
| 2012/0270490 A1 | 10/2012 | Turner et al. |
| 2012/0312611 A1 | 12/2012 | Van Buren et al. |
| 2013/0001454 A1 | 1/2013 | Schwarz et al. |
| 2013/0025952 A1 | 1/2013 | Kitashiba et al. |
| 2013/0036991 A1 | 2/2013 | Kerns |
| 2013/0068403 A1 * | 3/2013 | Fenchak ............... B60K 11/085 160/218 |
| 2013/0075172 A1 | 3/2013 | Hori |
| 2013/0092463 A1 * | 4/2013 | Hori ............... B60K 11/085 180/68.1 |
| 2013/0095740 A1 | 4/2013 | Hori |
| 2013/0103265 A1 | 4/2013 | Remy et al. |
| 2013/0126253 A1 | 5/2013 | Saito et al. |
| 2013/0146375 A1 | 6/2013 | Lee |
| 2013/0223980 A1 | 8/2013 | Pastrick et al. |
| 2013/0247862 A1 | 9/2013 | Sakai |
| 2013/0252531 A1 * | 9/2013 | Asano ............... B60K 11/085 454/155 |
| 2013/0252538 A1 | 9/2013 | Huber et al. |
| 2013/0268164 A1 | 10/2013 | Sugiyama |
| 2013/0275009 A1 | 10/2013 | Sakai |
| 2013/0284401 A1 | 10/2013 | Kiener et al. |
| 2014/0090610 A1 | 4/2014 | Higuchi et al. |
| 2014/0094104 A1 | 4/2014 | Manhire et al. |
| 2014/0170960 A1 | 6/2014 | Vacca |
| 2014/0174220 A1 | 6/2014 | Jeong et al. |
| 2014/0194052 A1 | 7/2014 | Asano et al. |
| 2014/0196965 A1 | 7/2014 | Platto et al. |
| 2014/0216834 A1 * | 8/2014 | Elliott ............... B60K 11/085 180/68.1 |
| 2014/0273806 A1 * | 9/2014 | Frayer, III ............... B60K 11/085 454/335 |
| 2014/0299077 A1 | 10/2014 | Sowards et al. |
| 2015/0231962 A1 | 8/2015 | Ruppert et al. |
| 2016/0236563 A1 * | 8/2016 | Ruppert ............... B60K 11/085 |

* cited by examiner

ACTIVE GRILLE SHUTTER AND SHUTTER SUBASSEMBLY FOR USE WITH ACTIVE GRILL SHUTTERS

CROSS-REFERENCE TO RELATED APPLICATION

The subject patent application claims priority to and all the benefits of U.S. Provisional Patent Application Ser. No. 62/301,310 which was filed on Feb. 29, 2016, the disclosure of which is hereby incorporated by reference.

BACKGROUND OF THE INVENTION

1. Field of the Invention

The present invention relates, generally, to shutter assemblies for vehicles and, more specifically, to an active grille shutter for a vehicle and to a shutter subassembly for use with an active grille shutter for a vehicle.

2. Description of the Related Art

Grille shutters are used in connection with regulating airflow towards one or more heat exchangers used in connection with a powertrain of a vehicle, such as an automotive passenger vehicle. Heat exchangers are commonly used to regulate the temperature of various fluids circulated in internal combustion engines, whereby heat is typically removed from the fluid as it flows through the heat exchanger as cooler ambient air flows across the heat exchanger from a fan or as the vehicle travels at speed. Heat exchangers are realized in different ways and are used to cool correspondingly different types of fluid. By way of example, the heat exchanger may be realized as a radiator employed to cool engine coolant, an oil cooler employed to cool lubricating oil in the engine or transmission, an intercooler employed to cool charge air from a turbocharger or supercharger, a condenser employed to cool refrigerant in an air conditioning system, and the like.

Conventional grille shutters include a frame with a grille opening positioned adjacent to the heat exchanger and through which ambient air is taken in, and a plurality of shutters or fins disposed in the grille opening to be opened or closed. Here, the grille shutter typically includes a plurality of fins which are supported on shafts and which rotate concurrently about the shafts via connection with an interlocking arm. The interlocking arm, in turn, is connected to a link mechanism driven by an actuator in order to rotate the fins so as to open or close the grille opening.

Under certain vehicle operating conditions, such as at engine startup and during engine warmup, the fins may be rotated so as to block or otherwise restrict airflow to heat exchangers, such as the engine radiator, in order to decrease engine warmup time which, in turn, promotes reduced fuel consumption and improved emissions. Similarly, grille shutters are used to modify airflow to heat exchangers when the vehicle is traveling at speed, whereby aerodynamic drag can be reduced by rotating the fins so as to divert airflow away from the heat exchanger, thereby further contributing to increased fuel efficiency and improved emissions. Furthermore, grille shutters can be used to improve airflow across heat exchangers under certain vehicle operating conditions, such as during idle in hot ambient conditions where the fins can be opened so as to promote maximum airflow across the heat exchanger.

One disadvantage with conventional grille shutters is that they frequently employ link mechanisms and actuators which are complex to manufacture and which are typically exposed to debris and environmental contaminants. In addition, conventional grille shutters often necessitate that the fins flex or bend significantly in order to allow them to be installed to the frame, which complicates assembly and may require increased clearances to be provided between certain components. Here, increased tolerances can result in rattles or other noise generation during use under certain operating conditions.

Moreover, in certain vehicle applications, the fins can be relatively large and may require correspondingly large tooling for manufacturing. Thus, while grille shutter assemblies known in the related art have generally performed well for their intended use, there remains a need in the art for a grille shutter assembly with improved durability, which performs consistently under different vehicle operating conditions, and which promotes ease of assembly while, at the same time, reducing the cost of manufacturing the components of the grille shutter assembly.

SUMMARY OF THE INVENTION

The present invention overcomes the disadvantages in the related art in an active grille shutter for use in regulating airflow towards a heat exchanger of a vehicle. The active grille shutter includes a frame adapted to be disposed adjacent to the heat exchanger of the vehicle. The frame has a first mount with a first plurality of bearing bores, a second mount spaced from the first mount, and at least one opening arranged between the mounts to allow air to pass through the opening towards the heat exchanger of the vehicle. An end cap is arranged to secure to the second mount of the frame, and has a second plurality of bearing bores. A plurality of vanes are provided. Each of the vanes extends across the opening between opposing longitudinal ends, and a receiver is formed at each of the longitudinal ends of each of the vanes. An end cap bearing is operatively attached to each of the longitudinal ends of each of the vanes. Each of the end cap bearings has a shaft arranged to be rotatably received by one of the bearing bores, and a coupler extending away from the shaft shaped to secure to one of the receivers of one of the vanes for concurrent movement. A linkage interconnects the vanes adjacent to one of the longitudinal ends such that the vanes rotate concurrently. An actuator is disposed in torque-translating relationship with at least one of the end cap bearings such that rotation of the actuator is imparted to each of the vanes via the linkage to concurrently rotate each of the vanes within the opening so as to regulate airflow through the opening towards the heat exchanger of the vehicle.

In addition, the present invention is directed toward a shutter subassembly for use in an active grille shutter arranged to regulate airflow through an opening towards a heat exchanger of a vehicle. The active grille shutter has a frame and a pair of mounts arranged on opposing sides of the opening with each of the mounts defining a respective bearing bore. The shutter subassembly includes a vane extending between opposing longitudinal ends with a receiver formed at each of the longitudinal ends. A pair of end cap bearings are provided. Each of the end cap bearings has a coupler shaped to engage one of the receivers of the vane so as to secure the end cap bearing to the vane for concurrent movement, and a shaft extending away from the coupler and arranged for rotatable engagement with one of the bearing bores of the active grill shutter.

In this way, the active grille shutter and shutter subassembly overcome the disadvantages in the prior art by facilitating significantly improved ease of assembly. Moreover, the grille shutter assembly and shutter subassembly afford opportunities for decreased manufacturing and assembly costs while maintaining durable, reliable, and noise-free performance under a number of different vehicle operating conditions.

Other objects, features, and advantages of the present invention will be readily appreciated as the same becomes better understood after reading the subsequent description taken in connection with the accompanying drawings.

DETAILED DESCRIPTION OF THE INVENTION

Figure 1:
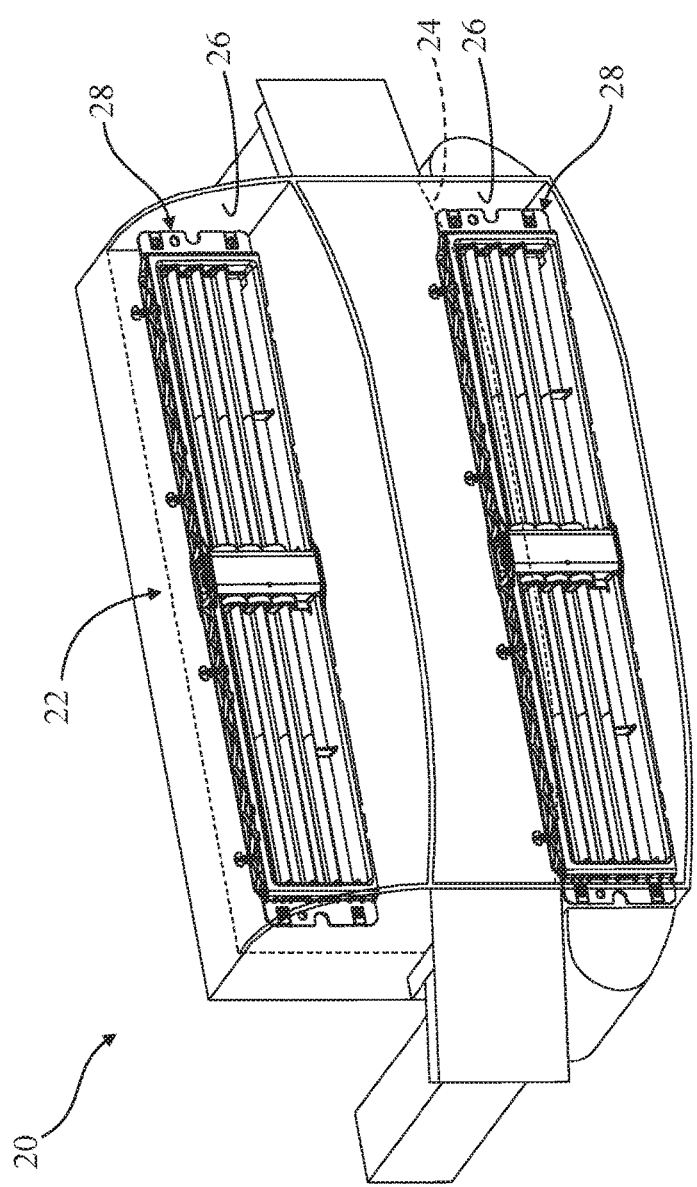
FIG. 1 is a perspective view of an active grille shutter, according to one embodiment of the present invention, shown mounted to a front portion of a vehicle.

Referring now to the drawings, where like numerals are used to designate like structure, a portion of a vehicle is illustrated at 20 in FIG. 1. The vehicle 20 includes a heat exchanger, depicted generally at 22, which is mounted to a chassis support member 24 adjacent to an engine compartment of the vehicle 20, such as a frame member, a brace, a "core support," and the like. The chassis support member 24 has upper and lower grille openings 26 to allow ambient air to be taken in and cool the heat exchanger 22. Adjacent to each grille opening 26, the vehicle 20 includes an active grille shutter, generally indicated at 28, according to one embodiment of the present invention. The active grille shutter assemblies 28 are employed for use in regulating airflow towards one or more heat exchangers 22 of the vehicle 20, as described in greater detail below. As illustrated, the vehicle 20 is a passenger automobile, but could be any type of vehicle, such as a heavy-duty truck, train, airplane, ship, construction vehicle or equipment, military vehicle, or any other type of vehicle 20 which regulates airflow to one or more heat exchangers 22. It should be appreciated that the vehicle 20 is conventional and does not form a part of the present invention, which is directed towards the active grille shutter 28.

In the representative embodiment illustrated in FIG. 1, the heat exchanger 22 is positioned at the front of the vehicle 20 such that air flowing through one or more of the grille openings 26 can be used to cool or otherwise regulate the temperature of fluid flowing through the heat exchanger 22 as needed, such as during vehicle 20 use or after the vehicle 20 has been shut off. Those having ordinary skill in the art will appreciate that vehicles 20 frequently employ multiple heat exchangers 22 of different types to regulate the temperature of various fluids circulated in internal combustion engines, whereby heat is typically removed from the fluid as it flows through the heat exchanger 22 as cooler ambient air flows across the heat exchanger 22 from a fan (not shown, but generally known in the related art) or as the vehicle 20 travels at speed. Thus, it will be appreciated that heat exchangers 22 can be realized in different ways and may be used to cool correspondingly different types of fluid. By way of example, the heat exchanger 22 may be realized as a radiator employed to cool engine coolant, an oil cooler employed to cool lubricating oil in the engine or transmission, an intercooler employed to cool charge air from a turbocharger or supercharger, a condenser employed to cool refrigerant in an air conditioning system, and the like.

While the vehicle 20 illustrated in FIG. 1 shows a heat exchanger 22 realized as a radiator positioned at the front of the vehicle 20 behind upper and lower grille openings 26 and a pair of respective active grille shutter assemblies 28, those having ordinary skill in the art will appreciate that the vehicle 20 could employ any number of heat exchangers 22 of any suitable type, positioned in any suitable location on the vehicle 20 adjacent to any suitable number of grille openings 26 and/or active grille shutter assemblies 28, without departing from the scope of the present invention. Moreover, while the active grille shutter assemblies 28 are schematically illustrated as being operatively attached to the chassis support member 24, those having ordinary skill in the art will appreciate that one or more active grille shutter assemblies 28 could be operatively attached to or otherwise integrated into any suitable part of the vehicle 20 without departing from the scope of the present invention. By way of non-limiting example, an active grille shutter 28 could be integrated into a front fascia of the vehicle 20, such as in part of a bumper cover or a grille cover (not shown, but generally known in the related art).

Figure 2:
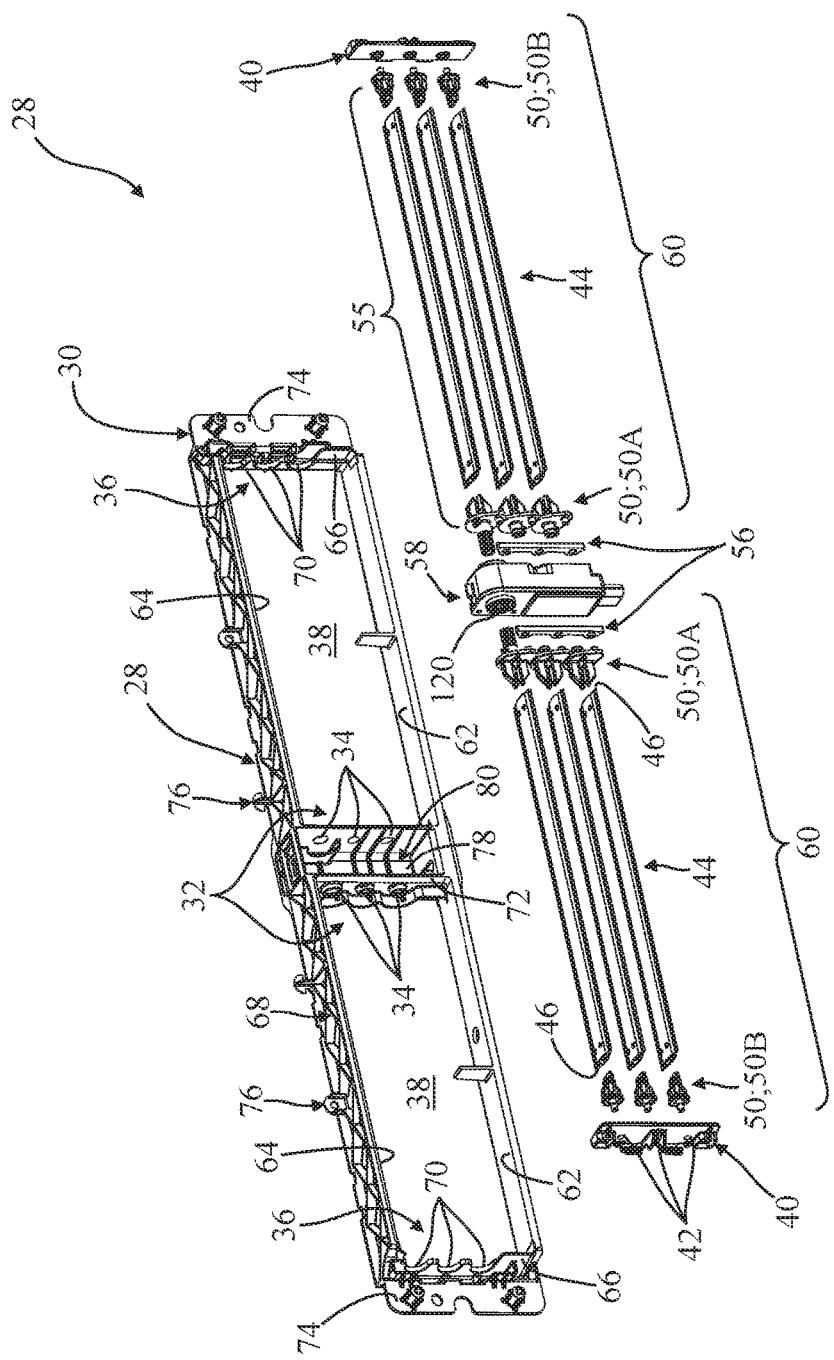
FIG. 2 is an exploded perspective view of the active grille shutter of FIG. 1, according to one embodiment of the present invention.

Referring now to FIGS. 1-11, as noted above, the active grille shutter 28 is used to regulate airflow towards the heat exchanger 22 of the vehicle 20. To this end, as is best shown in FIG. 2, the active grille shutter 28 includes a frame, generally indicated at 30, in one embodiment which is adapted to be disposed adjacent to the heat exchanger 22 and which is configured for connection to the chassis support member 24 of the vehicle 20. The frame 30 has a first mount, generally indicated at 32, with a first plurality of bearing bores 34. The frame 30 also has a second mount, generally indicated at 36, spaced from the first mount 32, and at least one opening, generally indicated at 38, arranged between the first and second mounts 32, 36 to allow air to pass through the opening 38 towards the heat exchanger 22 of the vehicle 20. An end cap 40 is provided and is arranged to secure to the second mount 36 of the frame 30. The end cap 40 has a second plurality of bearing bores 42. In one embodiment, a plurality of vanes 44 are provided, each extending across the opening 38 between opposing longitudinal ends 46. Each of the vanes 44 has a receiver, generally indicated at 48, disposed at each respective longitudinal end 46. A plurality of end cap bearings, generally indicated at 50, are provided. The end cap bearings 50 are formed as separate components from the vanes 44, and each has a coupler, generally indicated at 52, which is shaped to secure to one of the receivers 48 of one of the vanes 44 for concurrent movement with the vane 44. The end cap bearings 50 each also have a shaft 54 which extends away from the coupler 52 and which is arranged so as to be rotatably received by one of the bearing bores 34, 42 such that the vanes 44 can rotate about the bearing bores 34, 42. In one embodiment, a vane 44 and two end cap bearings 50 cooperate so as to define a shutter subassembly 55 which is adapted for rotation between a single first bearing bore 34 and a single second bearing bore 42A. Where a plurality of vanes 44 (and, thus, a plurality of shutter subassemblies 55) are provided, a linkage 56 interconnects end cap bearings 50 at a common longitudinal end 46 of the vanes 44 such that the vanes 44 rotate concurrently. To this end, an actuator, generally indicated at 58, is employed for providing a source of rotational torque. In one embodiment, the actuator 58 is operatively attached to the frame 30 adjacent to the first mount 32 and is rotatably coupled to one of the end cap bearings 50 such that rotation of the actuator 58 is imparted to each of the vanes 44 by the linkage 56 to concurrently rotate the vanes 44 within the opening 38 so as to regulate airflow through the opening 38 towards the heat exchanger 22 of the vehicle 20. Put differently, the actuator 58 is disposed in torque-translating relationship with at least one of the end cap bearings 50 such that rotation of the actuator 58 is imparted to each of the vanes 44 via the linkage 56 to concurrently rotate each of the vanes 44 within the opening 38 so as to regulate airflow through the opening 38 towards the heat exchanger 22 of the vehicle 20. The frame 30, the end cap 40, the vanes 44, the end cap bearings 50, the linkage 56, and the actuator 58 will each be described in greater detail below.

With continued reference to FIG. 2, in one embodiment, the end cap 40, the vanes 44, the end cap bearings 50, and the linkage 56 form a shutter assembly, generally indicated at 60, which is configured to be installed into the frame 30 across the opening 38 between the mounts 32, 36. In the representative embodiment illustrated herein, the frame 30 is configured so as to support a pair of shutter assemblies 60 on opposing longitudinal sides of the actuator 58, each of the shutter assemblies 60 having three shutter subassemblies 55. Thus, in this embodiment, the frame 30 includes a pair of first mounts 32, a pair of second mounts 36, and a corresponding pair of openings 38 across which the vanes 44 of the respective shutter assemblies 60 extend.

The frame 30 is generally rectangular in shape and includes a bottom wall 62 extending longitudinally, a top wall 64 extending longitudinally and spaced vertically from the bottom wall 62, and side walls 66 extending between and perpendicular to the bottom wall 62 and top wall 64 at the ends thereof. The bottom wall 62 and top wall 64 have truss members 68 with a generally "X" shape extending outwardly on an exterior surface thereof. The side walls 66 are positioned adjacent to the second mount 36, have a plurality of arcuate recesses 70 defined therein, and cooperate to secure the end caps 40 of the shutter assemblies 60 to the frame 30, as described in greater detail below. The frame 30 also includes a pair of interior walls 72 spaced longitudinally from each other on opposing sides of the actuator 58 and extending vertically between the bottom wall 62 and the top wall 64. Here, the interior walls 72 respectively form part of the first mount 32 such that each includes one of the first plurality of bearing bores 34 for receiving shafts 54 of the end cap bearings 50 of the respective shutter assemblies 60 (see also FIG. 6). Each interior wall 72 cooperates with one side wall 66, the top wall 64, and bottom wall 62 to form one of the openings 38 for air to pass therethrough. As illustrated, the openings 38 are generally rectangular in shape, but could have any suitable shape or configuration without departing from the scope of the present invention.

The frame 30 further includes an end flange 74 extending perpendicularly from each side wall 66 adjacent to the second mounts 36. As noted above, the second mounts 36 are configured to receive the end caps 40 of the respective shutter assemblies 60, as described in greater detail below. The frame 30 also includes one or more securing features, generally indicated at 76, formed such as apertures defined in the end flanges 74 and/or as projections extending from the bottom and/or top walls 62, 64, which are configured to facilitate attachment of the frame 30 to the chassis support member 24 and/or to other portions of the vehicle 20. However, those having ordinary skill in the art will appreciate that the securing features 76 could be arranged, configured, or disposed in any suitable way sufficient to secure to the vehicle 20 without departing from the scope of the present invention.

The frame 30 also includes a shelf, generally indicated at 78, which extends longitudinally between the interior walls 72 and vertically between the top wall 64 and the bottom wall 62. The shelf 78 conceals the actuator 58 from direct exposure to airflow in use, which also protects the actuator 58 from road debris and other contaminants. Here, the shelf 78, interior walls 72, bottom wall 62, and top wall 64 cooperate so as to define an actuator receptacle, generally indicated at 80, which receives and secures the actuator 58 adjacent to the first mounts 32. The frame 30 is made of a rigid material, such as plastic, and is formed as an integral, unitary, and one-piece component from a manufacturing process such as injection moulding. However, those having ordinary skill in the art will appreciate that the frame 30 could be manufactured in any suitable way and could be realized by any suitable number of components or structural features which cooperate to support the shutter assembly 60, without departing from the scope of the present invention.

Referring now to FIGS. 2, 7, 8, and 11, as noted above, the active grille shutter 28 includes a plurality of vanes 44 extending across the opening 38. Specifically, each shutter assembly 60 includes three shutter subassemblies 55 and, thus, three vanes 44 in the representative embodiment illustrated herein. However, as will be appreciated from the subsequent description below, the active grille shutter 28 could include any suitable number of shutter assemblies 60 with any suitable number of vanes 44 without departing from the scope of the present invention. The vanes 44 of the shutter subassemblies 55 are supported in the openings 38 and rotate about respective bearing bores 34, 42 so as to facilitate control of airflow through each respective opening 38 towards the heat exchanger 22, as noted above.

Figure 11:
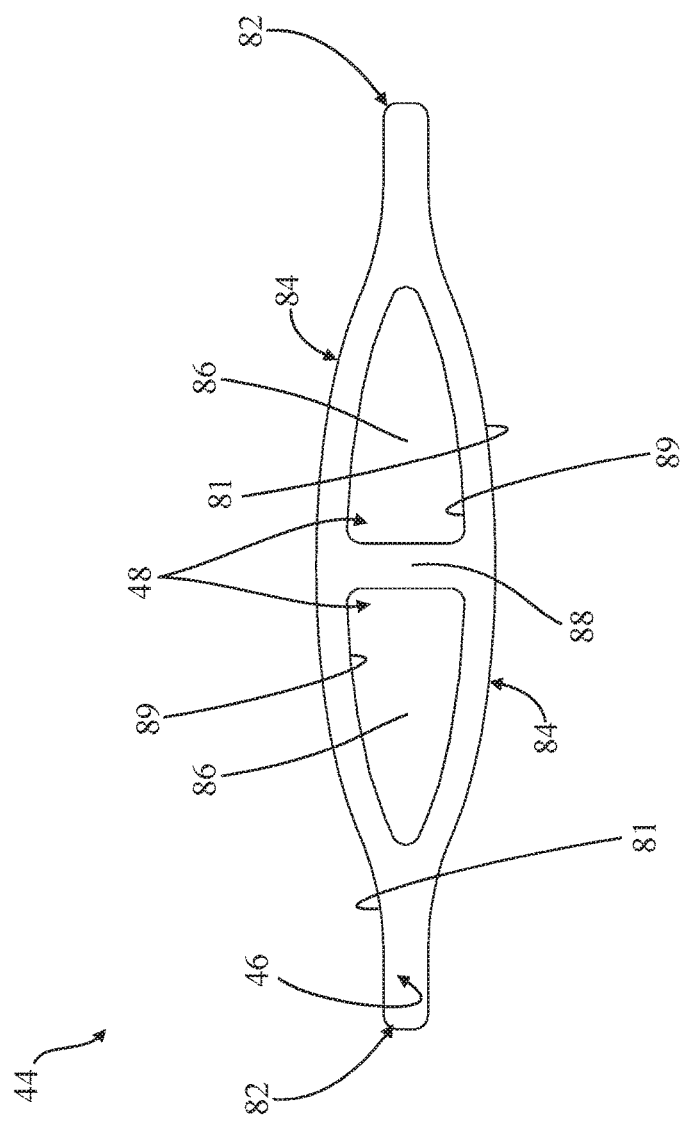
FIG. 11 is a front-side view of one of the vanes of FIG. 7.

As is shown best in FIG. 11, in one embodiment, the vanes 44 have an outer surface 81 defined by a tapered profile with a pair of opposing leading edge portions, generally indicated at 82, and camber surface portions, generally indicated at 84, which extend between and merge with the leading edge portions 82. Where the shutter assembly 60 employs a plurality of vanes 44, in one embodiment, the vanes 44 are shaped and arranged such that they at least partially abut each other and/or a portion of the frame 30 in certain configurations, such as where the vanes 44 are rotated so as to restrict airflow to the heat exchanger 22. Here, in one embodiment, where the leading edge portions 82 transition to and merge with the camber surface portions 84, the vanes 44 may have a coating, such as a rubberized skin coating, which may be bonded, adhered, co-extruded, or otherwise operatively attached to at least a portion of the outer surfaces of the vanes 44 which abut when obstructing airflow to the heat exchanger 22.

The vanes 44 are configured to a predetermined length between the longitudinal ends 46 corresponding to a particular application, and are manufactured via an extrusion process with a substantially constant cross-section, which enables the length of the vanes 44 to be easily adjusted without a substantial increase in manufacturing expense. In one embodiment, the vanes 44 each have a hollow 86 spaced from the outer surface 81 and shaped to receive at least a portion of the coupler 52 of the end cap bearing 50, as described in greater detail below. In the representative embodiment illustrated herein, the vanes 44 each have a pair of hollows 86 spaced from the outer surface 81 and also spaced from each other on opposing sides of a bridge 88. Each of the hollows 86 defines a respective inner surface 89 of the vanes 44. As explained in greater detail below, in one embodiment, the hollows 86 form part of the receivers 48 and help facilitate connection to the end cap bearings 50. Here, the hollows 86 and bridge 88 are sized and shaped so as to provide substantial rigidity to the vanes 44 in use while, at the same time, minimizing the amount of material used during manufacturing and facilitating connection of the vane 44 to end cap bearings 50 with differently configured couplers 52, as described in greater detail below. It will be appreciated that the vanes 44 could omit bridges 88 for certain applications, and thus could employ a single hollow 86 and a single inner surface 89.

Figure 7:
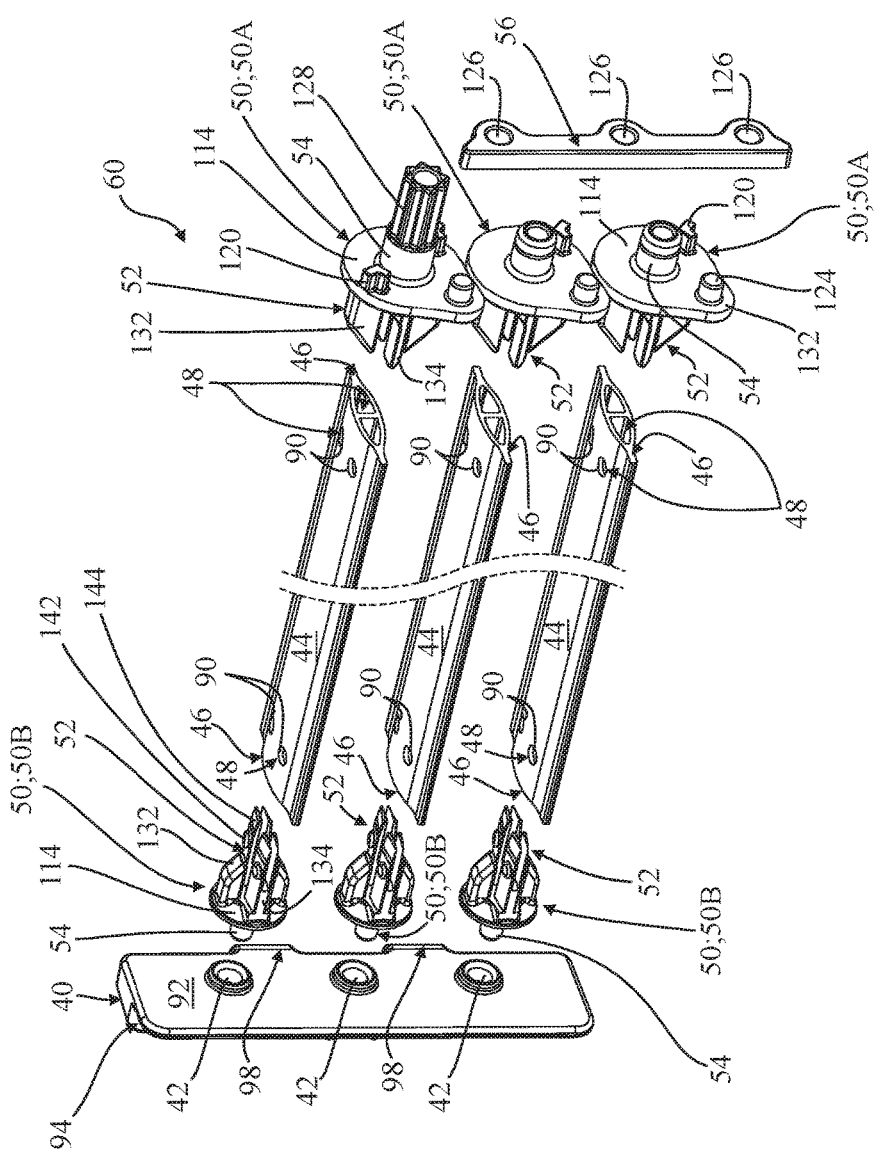
FIG. 7 is a partial exploded perspective view of the end cap and vane subassemblies of FIG. 5, showing a plurality of vanes, a plurality of cammed and uncammed end cap bearings, and a linkage.
Figure 8:
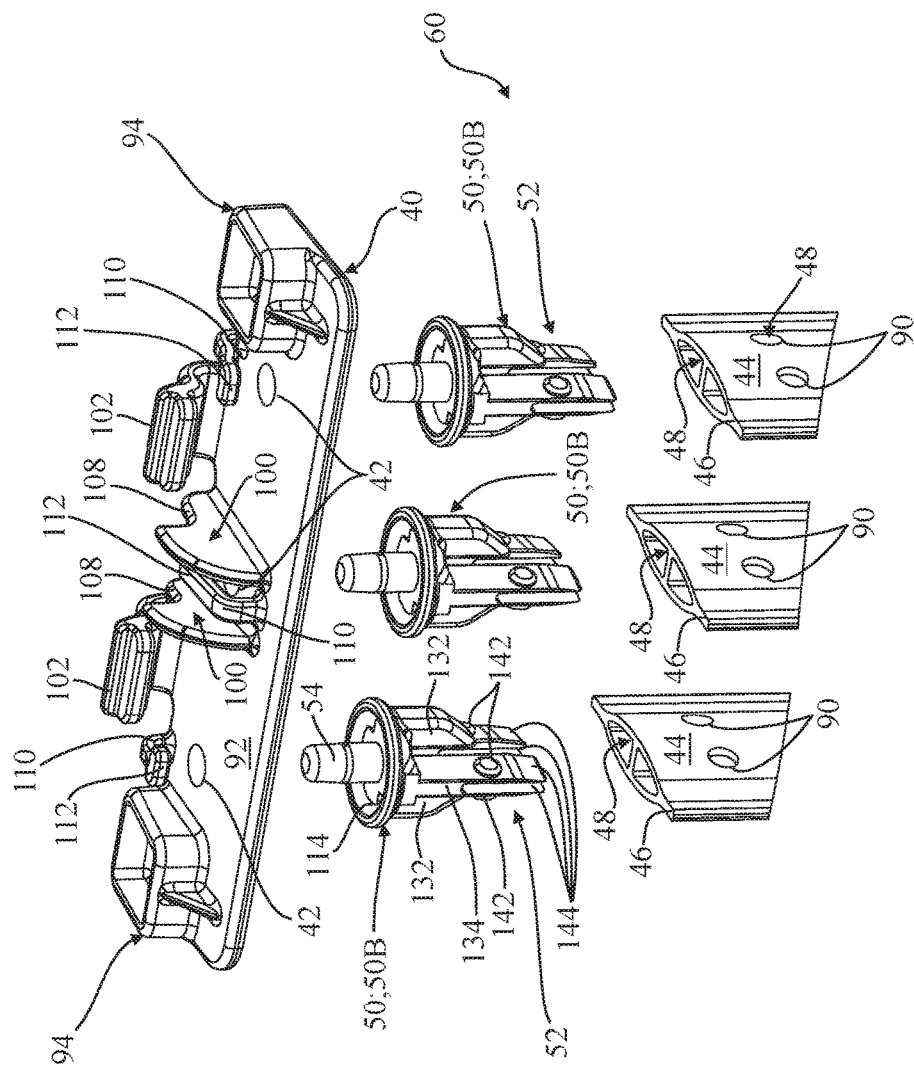
FIG. 8 is a partial exploded perspective view of the end cap, vanes, and uncammed end cap bearings of FIG. 7.

As shown best in FIGS. 7 and 8, the vanes 44 also include a retention hole 90 formed through the camber surface portion 84 adjacent to each longitudinal end 46. Put differently, the retention hole 90 extends from the outer surface 81 of the vane 44 into communication with the hollow 86. In the representative embodiment illustrated herein, four retentions holes 90 are formed at each longitudinal end 46 of each vane 44. The retention holes 90 are formed such as with a drilling operation which may occur simultaneously with a cutting operation carried out during manufacturing of the vanes 44. By way of non-limiting example, the retention holes 90 may be formed with four drill bits engaging respective longitudinal ends 46 of separate vanes 44 as each progressively manufactured vane 44 is cut to a predetermined length after a common extrusion has been formed and cooled. Here, the retention holes 90 also form part of the receivers 48 in one embodiment to help facilitate connection to the end cap bearings 50, as explained in greater detail below.

Referring now to FIGS. 2 and 5-8, as noted above, each shutter assembly 60 includes an end cap 40 with a second plurality of bearing bores 42, whereby the end cap 40 is configured to secure to one of the second mounts 36 of the frame 30. Here, the end cap 40 is employed to help facilitate installation of the respective shutter assembly 60 into the frame 30 and, at the same time, helps bias the vanes 44 towards the actuator 58. To that end, and as is shown best in FIGS. 7 and 8, the end caps 40 each include a generally rectangular base 92 in which the second plurality of bearing bores 42 are defined. The end caps 40 further include one or more tapered alignment guides, generally indicated at 94, which are shaped and arranged so as to guide the end caps 40 into correspondingly shaped guide pockets, generally indicated at 96, which form a portion of the second mounts 36. Here, the guide pockets 96 have a generally "C" shaped profile extending between and merging with the side walls 66 and the end flanges 74 of the frame 30, which is complimentarily shaped to the tapered profile of the alignment guides 94 so as to secure the end caps 40 vertically and longitudinally with respect to the frame 30 (see FIG. 5).

Figure 5:
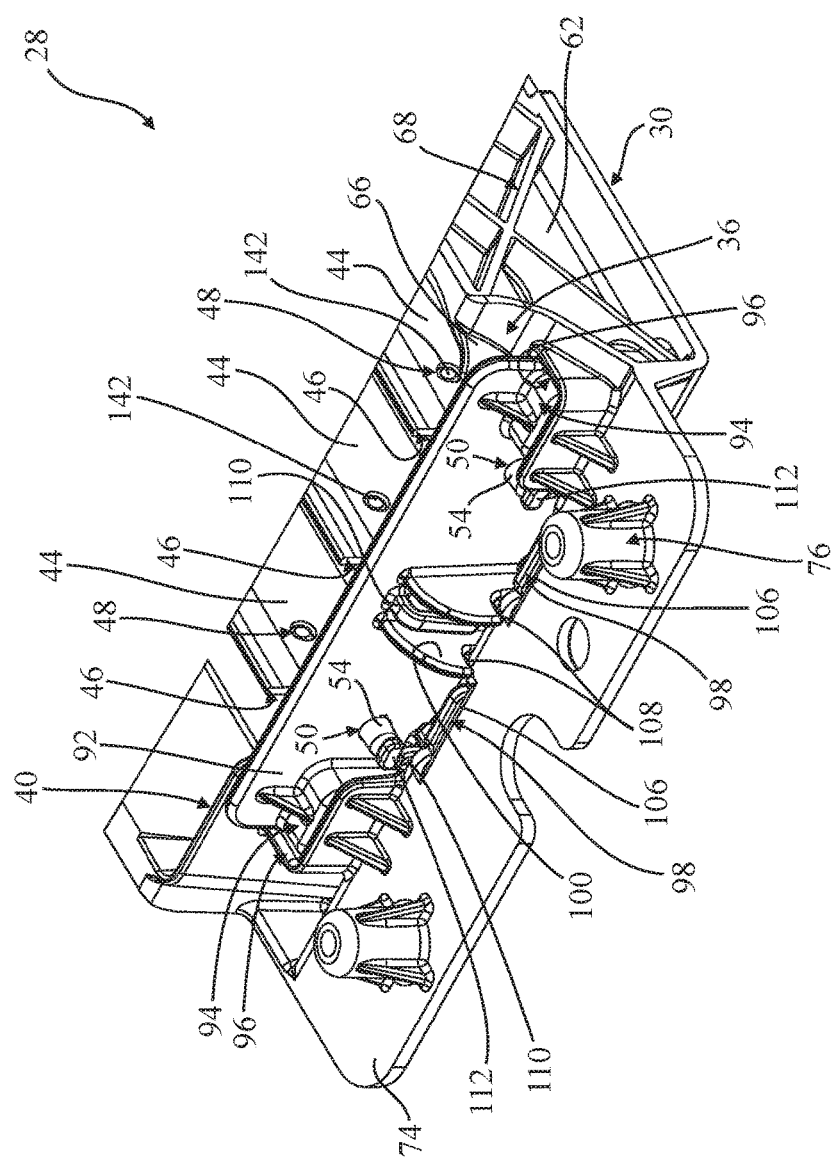
FIG. 5 is a partial perspective view of a portion of the active grille shutter of FIGS. 1-4, showing a frame with a mount securing an end cap supporting a plurality of vane subassemblies.
Figure 6:
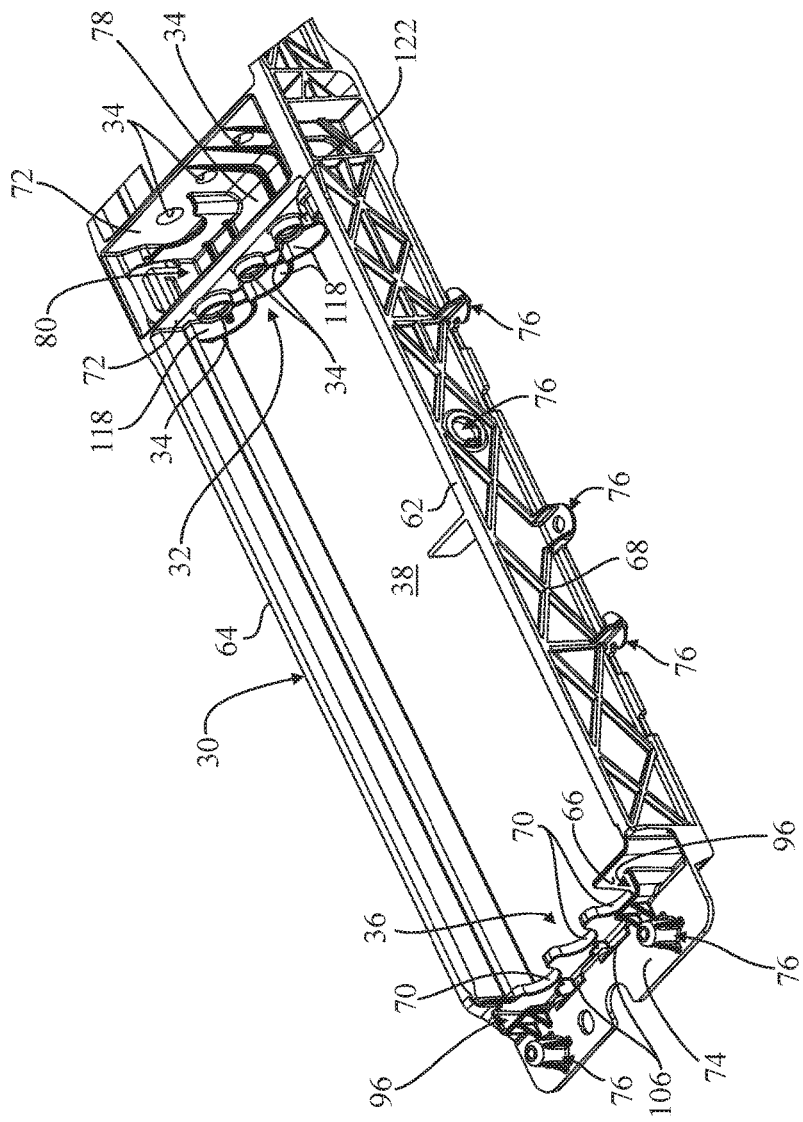
FIG. 6 is a partial perspective view of a portion of the frame of the active grille shutter of FIG. 5.

With continued reference to FIGS. 5 and 8, the end caps 40 also include one or more snaps, generally indicated at 98, which extend from the base 92, and one or more locating ribs, generally indicated at 100, which extend from the base 92 and which are spaced from the snaps 98. Here, the snaps 98 have a stepped, curved profile extending from the base 92 to a snap end, generally indicated at 102, such that the snaps 98 can bend or otherwise move resiliently with respect to the base 92 so as to facilitate installation into the second mounts 36 (see FIG. 8). To that end, the snaps 98 also include a tooth 104 extending outwardly adjacent to the snap end 102. Here, the teeth 104 and portions of the snaps 98 engage in correspondingly-shaped apertures, generally indicated at 106, of the second mounts 36 which are formed adjacent to the guide pockets 96 (see also FIG. 6). The locating ribs 100, in turn, each have an abutment rib surface 108 which abuts a portion of the second mounts 36 adjacent to the apertures 106 when the end caps 40 are secured. As is shown best in FIG. 5, the teeth 104 of the snaps 98 and the abutment rib surfaces 108 of the locating ribs 100 cooperate so as to prevent lateral movement of the end caps 40 when secured to the second mounts 36.

Figure 10:
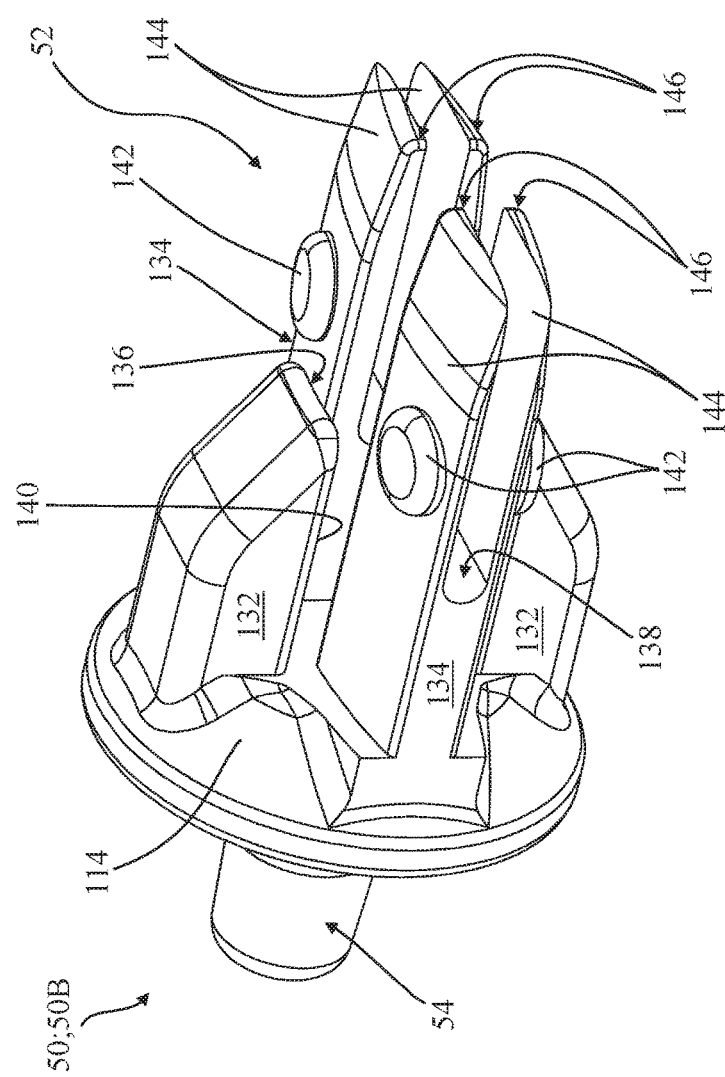
FIG. 10 is a perspective view of one of the uncammed end cap bearings of FIG. 7.

The end caps 40 each further include a spring finger, generally indicated at 110, which extends from the base 92 adjacent to each of the second bearing bores 42. Each of the spring fingers 110 is resiliently flexible and has a curved "L" shaped profile extending over one of the second bearing bores 42 to a finger end 112 configured to abut the end of the shafts 54 of the end cap bearings 50. As shown in FIG. 10, two of the three finger ends 112 have a bulbous profile and one has a narrower, non-bulbous profile. However, those having ordinary skill in the art will appreciate that the spring fingers 110 could have any suitable profile, shape, or configuration sufficient to bias the end cap bearings 50 and vanes 44 towards the actuator 58 and facilitate installation of the shutter assembly 60, without departing from the scope of the present invention. In one embodiment, the end caps 40 are made of a rigid material such as plastic, such as via injection molding, and are formed as integral, unitary, and one-piece components.

Referring now to FIGS. 2-10, as noted above, the shutter assembly 60 includes a plurality of end cap bearings 50 with couplers 52 for securing to the receivers 48 of the vanes 44. In one embodiment, each shutter assembly 60 includes a plurality of cammed end cap bearings 50A and a plurality of uncammed end cap bearings 50B. Put differently, each shutter subassembly 55 includes one vane 44, one cammed end cap bearing 50A, and one uncammed end cap bearing 50B. In one embodiment, the cammed end cap bearings 50A each are coupled to the linkage 56 to facilitate concurrent rotation of the vanes 44, as described in greater detail below. In the representative embodiment illustrated throughout FIGS. 2-10, the shafts 54 of the cammed end cap bearings 50A are supported in the first bearing bores 34 disposed adjacent to the first mount 32, and the shafts 54 of the uncammed end cap bearings 50B are supported in the second bearing bores 42 disposed adjacent to the second mount 36. Thus, the linkage 56 is disposed adjacent to the first mount 32 (see FIG. 2). However, those having ordinary skill in the art will appreciate from the subsequent description of the end cap bearings 50 that either or both sets of end cap bearings 50 on respective longitudinal ends 46 of the vanes 44 could be cammed, and either or both sets could thus employ a linkage 56, without departing from the scope of the present invention.

Referring now to FIGS. 7, 8, and 10, one embodiment of the uncammed end cap bearing 50B is shown in various orientations. Here, the uncammed end cap bearings 50B each have a hub, generally indicated at 114, from which the shaft 54 and the coupler 52 extend in opposing directions (see FIG. 10). The hubs 114 are arranged so as to be disposed adjacent to or within the arcuate recesses 70 of the frame 30 (see FIGS. 2 and 6).

Referring now to FIGS. 2, 4, 7, and 9, one embodiment of the cammed end cap bearing 50A is shown in various orientations. Here, the cammed end cap bearings 50A similarly each have a hub 114 from which the shaft 54 and the coupler 52 extend in opposing directions. However, the hub 114 of cammed end cap bearing 50A further includes a cam hub portion 116 arranged to be disposed adjacent to or within arcuate pockets, generally indicated at 118, of the frame 30 which are formed adjacent to the first bearing bores 34 (see FIGS. 2 and 6). The cam hub portions 116 also include one or more stop members, generally indicated at 120, which extend from the cam hub portion 116 and which are arranged to abut end stops, generally indicated at 122, in certain rotational positions of the vanes 44 (see, for example, FIG. 4). Here, the end stops 122 are formed adjacent to the first mount 32, extend from the arcuate pockets 118 of the frame 30 towards the first bearing bores 34, and are arranged so as to come into abutment with the end stops 122 of the cam hub portions 116 at certain predetermined rotational positions of the vanes 44 so as to limit rotation of the vanes 44.

As shown in FIG. 7, the cam hub portions 116 and the hubs 114 of the cammed end cap bearings 50A cooperate to define an egg-shaped profile. Here, a boss 124 extends longitudinally outwardly from the cam hub portion 116 towards the actuator 58 so as to rotatably engage corresponding linkage holes 126 formed in the linkage 56 so as to facilitate concurrent rotation of the vanes 44 of each of the shutter subassemblies 55 of each respective shutter assembly 60, as noted above. As shown in FIGS. 2 and 7, in one embodiment, one of the cammed end cap bearings 50A includes a driveshaft 128 which extends from and merges with the shaft 54. The driveshaft 128 has a splined configuration which is received by a correspondingly-shaped splined receiving cavity 130 of the actuator 58 so as to effect concurrent rotation between the actuator 58 and the cammed end cap bearing 50A which is provided with the driveshaft 128. Thus, rotational torque generated by the actuator 58 rotates this cammed end cap bearing 50A, as well as the vane 44 and the uncammed end cap bearing 50B which cooperate to define its respective shutter subassembly 55. Moreover, because of the linkage 56, rotation is translated to each shutter subassembly 55 so as to rotate each vane 44 of the shutter assembly 60 concurrently. Those having ordinary skill in the art will appreciate that other configurations are contemplated. By way of non-limiting example, the driveshaft 128 could be provided on an uncammed end cap bearing 50B in some embodiments.

Figure 3:
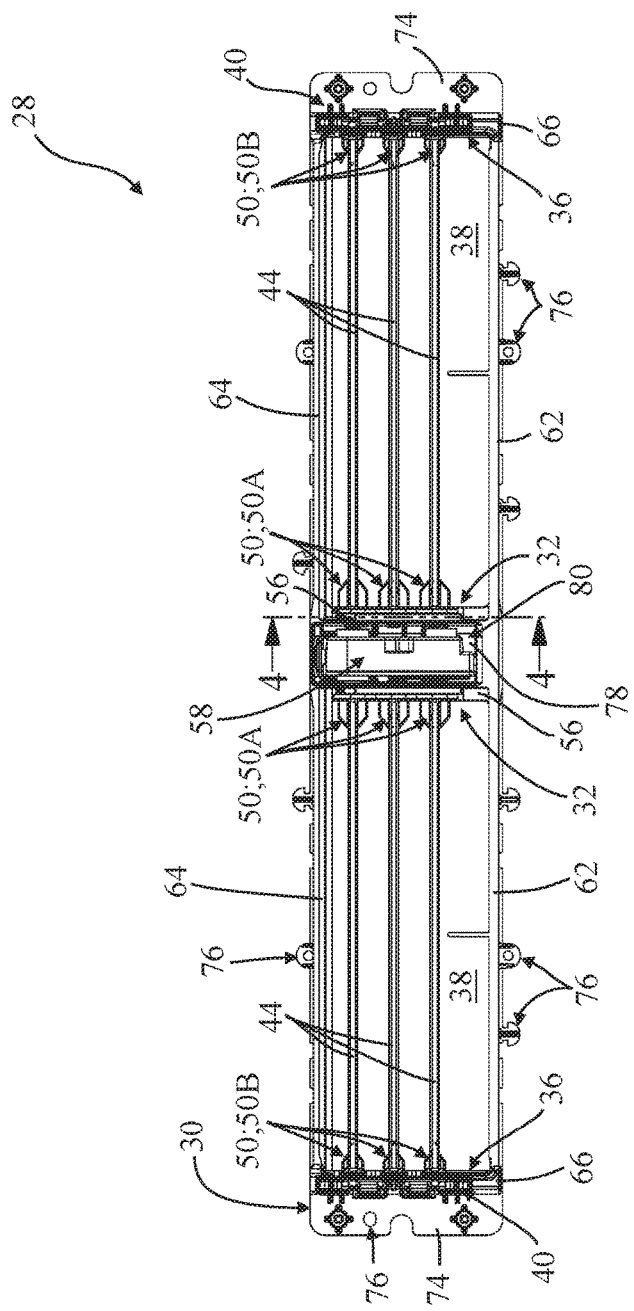
FIG. 3 is a top-side view of the active grille shutter of FIGS. 1 and 2.
Figure 4:
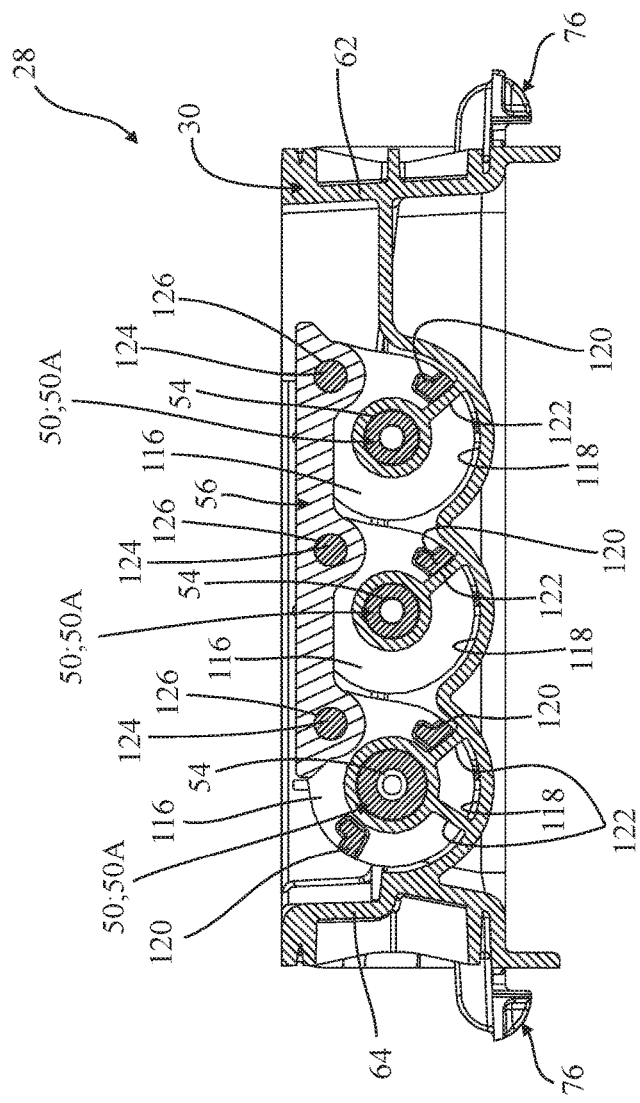
FIG. 4 is a sectional view taken along line 4-4 of FIG. 3.

Referring now to FIGS. 2-3, as noted above, the actuator 58 is employed to selectively provide a source of rotational torque to effect concurrent rotation of the vanes 44 in the opening 38 via the linkage 56. The actuator 58 is of an electric type and adapted to be connected to a source of power (not shown, but generally known in the related art). The actuator 58 employs splined receiving cavities 130 on each opposing side to receive the respective splined driveshaft 128 of one of the end cap bearings 50 from each of the shutter assemblies 60, as noted above. The actuator 58 is secured in the actuator receptacle 80 of the frame 30 by a hook feature (not shown in detail) which cooperates with an electrical harness connector (not shown in detail), adapted to facilitate electrical connection with the actuator 58, so as to operatively attach the actuator 58 to the frame 30 in a simple and efficient manner. However, those having ordinary skill in the art will appreciate that the actuator 58 could be attached or fixed to the frame 30 in any suitable way without departing from the scope of the present invention. It should be appreciated that the orientation of the actuator 58 within the frame 30 helps to protect the actuator 58 from road debris. It should also be appreciated that the actuator 58 may be connected to an electronic controller (not shown, but generally known in the art) to receive signals to move the vanes 44 in response to a sensed condition for opening or closing the vanes 44 to correspondingly adjust airflow to the heat exchanger 22 of the vehicle 20.

In the representative embodiment illustrated herein, in order to facilitate attachment to the receiver 48 of the vane 44, the coupler 52 employs at least one brace, generally indicated at 132, and/or at least one protrusion, generally indicated at 134. The brace 132 extends from the hub 114, away from the shaft 54, towards a brace end 136. Similarly, the protrusion 134 extends from the hub 114, away from the shaft 54, towards a protrusion end 138. As is explained in greater detail below, the brace 132 is configured so as to at least partially engage the outer surface 81 of the vane 44 adjacent to the longitudinal end 46, and the protrusion 134 is configured to be at least partially disposed within the hollow 86 of the vane 44 adjacent to the longitudinal end 46, so as to secure the receiver 48 and the coupler 52 to effect the concurrent movement between the vane 44 and the end cap bearings 50 of each respective shutter subassembly 55, as described above. The braces 132 and the protrusions 134 will each be described in greater detail below.

It will be appreciated that the couplers 52 could employ a plurality of braces 132 and/or protrusions 134 with different shapes, profiles, arrangements, and the like. For example, in the embodiment of the uncammed end cap bearing 50B depicted in FIG. 10, a pair of braces 132 and a pair of protrusions 134 are provided, interposed between each other in alternating fashion relative to rotation of the shaft 54.

As noted above, in certain embodiments, one or more braces 132 are provided as a part of the coupler 52 to help secure the end cap bearing 50 to the longitudinal end 46 of the vane 44. More specifically, the brace 132 may be employed to prevent or otherwise limit lateral movement between the vane 44 and the respective end cap bearing 50. To this end, in some embodiments, such as with the cammed end cap bearing 50A depicted in FIG. 9 and the with uncammed end cap bearing 50B depicted in FIG. 10, a pair of braces 132 are provided with each brace 132 extending away from the shaft 54 so as to define a respective support surface 140 arranged to abut a portion of the outer surface 81 of the vane 44. In one embodiment, the support surface 140 at least partially abuts one of the camber surface portions 84 of the vane 44 adjacent to the longitudinal end 46. The braces 132 have a generally rigid profile which may taper in one or more directions between the hub 114 and the brace end 136. It will be appreciated that the coupler 52 could be provided with any suitable number of braces 132, with similar or different configurations, shapes, and/or profiles.

As noted above, in certain embodiments, one or more protrusions 134 are provided as a part of the coupler 52 to help secure the end cap bearing 50 to the longitudinal end 46 of the vane 44. Here too, the protrusion 134 may be employed to prevent or otherwise limit lateral movement between the vane 44 and the respective end cap bearing 50. To this end, in some embodiments, the protrusions 134 are shaped so as to be received by one of the hollows 86 of the vane 44 and at least partially engage a portion of the inner surface 89 defined by the hollow 86. The protrusions 134 similarly have a generally rigid profile which may taper in one or more directions between the hub 114 and the protrusion end 138. Here too, it will be appreciated that the coupler 52 could be provided with any suitable number of protrusions 134, with similar or different configurations, shapes, and/or profiles.

In order to limit or otherwise prevent longitudinal disengagement between the vane 44 and the end cap bearings 50, in one embodiment, the coupler 52 further includes a detent formation, generally indicated at 142, which is shaped to engage the retention hole 90 of the receiver 48, which in turn, is formed in the vane 44 adjacent to the longitudinal end 46 extending from the outer surface 81 into communication with the hollow 86, as noted above. However, as will be appreciated from the subsequent description below, the detent formation 142 can be configured in a number of different ways.

Figure 9:
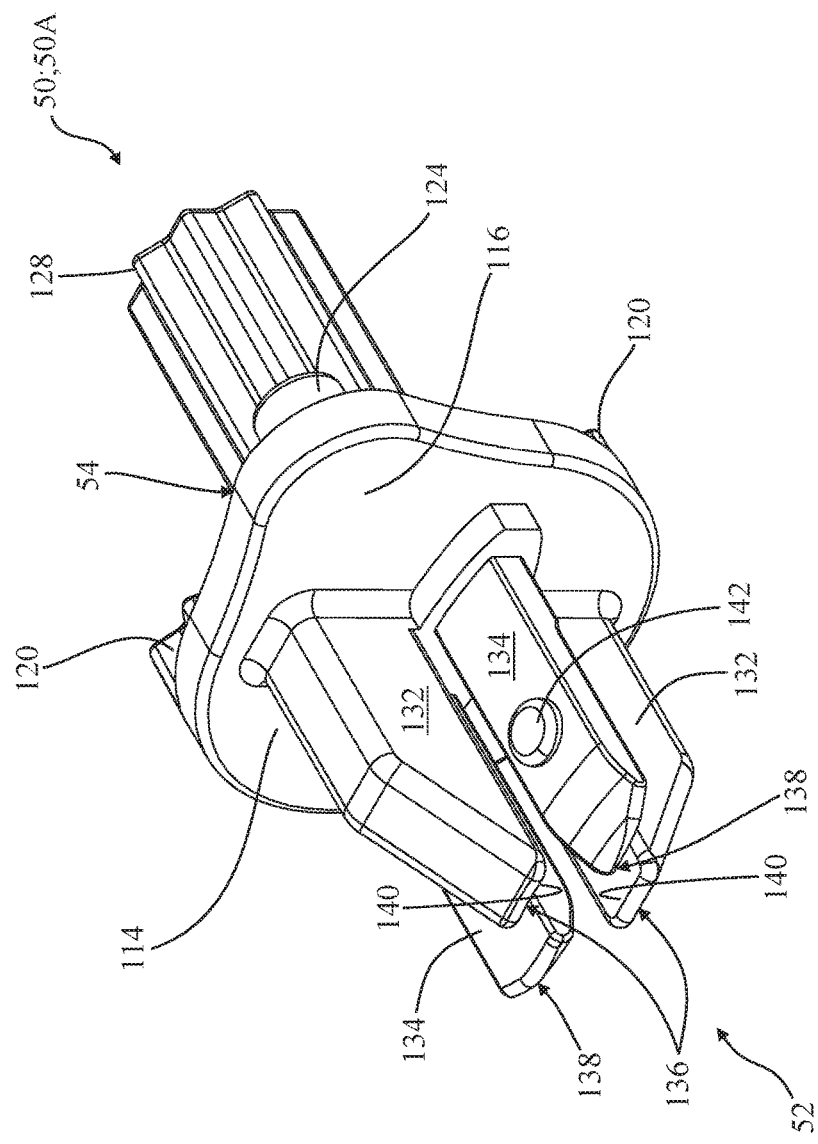
FIG. 9 is a perspective view of one of the cammed end cap bearings of FIG. 7.

In the representative embodiment of the cammed end cap bearing 50A depicted in FIGS. 7 and 9, the coupler 52 includes a pair of protrusions 134 each having a respective detent formation 142. Here, the detent formations 142 are formed integrally with the respective protrusions 134, extend in different directions, and each have a generally round, filleted profile which is shaped complimentarily to the retention holes 90 of the receiver 48 formed in the vane 44. However, other shapes and/or configurations of detent formations 142 and/or retention holes 90 are contemplated. In one embodiment, the detent formations 142 are arranged between the shaft 54 and the protrusion end 138. Put differently, the detent formation 142 is spaced from the hub 114 and from the protrusion end 138. In this representative embodiment of the cammed end cap bearing 50A, the two detent formations 142 are each respectively accommodated in one of the four retention holes 90 disposed at one of the longitudinal ends 46 of the vane 44. However, other arrangements may be utilized. By way of non-limiting example, a single detent formation 142 could be employed, more than one detent formation 142 could be provided on a single protrusion 134, and the like.

In one embodiment, the vane 44 is shaped and configured so as to at least partially deflect away from the protrusion 134 in response to engagement between the detent formation 142 and the inner surface 89 defined by the hollow 86, and is further shaped and configured so as to resiliently return towards the protrusion 134 when the detent formation 142 engages within the retention hole 90. It will be appreciated that this configuration helps facilitate installation between the receiver 48 and the coupler 52 while, at the same time, preventing disengagement of the end cap bearing 50 from the longitudinal end 46 of the vane 44 after installation. Moreover, while this configuration is advantageous for certain applications, such as where the protrusion 134 is relatively rigid, those having ordinary skill in the art will appreciate that other configurations are contemplated herein.

In the representative embodiment of the uncammed end cap bearing 50A depicted in FIGS. 7, 8, and 10, the coupler 52 further includes a resiliently flexible tongue 144 extending from the protrusion end 138 to a tongue end 146. Here in this embodiment, the detent formation 142 is formed on the tongue 144 and is arranged between the protrusion end 138 and the tongue end 146. In the representative embodiment of the uncammed end cap bearing 50B illustrated in FIG. 10, each protrusion 134 is provided with a pair of tongues 144 each having a respective detent formation 142. In this embodiment, the coupler 54 is provided with four detent formations 142, each of which is respectively accommodated in one of the four retention holes 90 disposed at one of the longitudinal ends 46 of the vane 44. However, other arrangements may be utilized, as noted above. By way of non-limiting example, each protrusion 134 could have a single tongue 144. By way of further non-limiting example, the coupler 52 could be provided with a single protrusion 134 with a pair of tongues 144. Moreover, while the tongues 144 are formed integrally with the protrusions 134 and extend from the protrusion ends 138 in the embodiment described above, those having ordinary skill in the art will appreciate that other configurations could be employed. By way of non-limiting example, the tongue 144 could extend from the hub 114 to the tongue end 146 and could be spaced from the protrusion 134.

The tongues 144 and protrusions 134 are inserted into the hollows 86 at the longitudinal ends 46 of the vanes 44 such that the tongues 144 of each protrusion 134 are deflected towards each other upon insertion into the hollows 86 and resiliently return away from each other when the detent formations 142 come into longitudinal alignment with the retention holes 90 of the vane 44, thereby securing the end cap bearing 50 to the longitudinal end 46 of the vane 44. While each tongue 144 of the uncammed end cap bearings 50B are shown as having a respective detent formation 142, those having ordinary skill in the art will appreciate that the tongues 144 could be arranged or otherwise configured differently, with or without inclusion of a discrete detent formation 142 assigned to each tongue 144, without departing from the scope of the present invention.

It will be appreciated that the end cap bearings 50 could be shaped, configured, or otherwise arranged in a number of different ways without departing from the scope of the present invention. Specifically, the active grille shutter 28 could employ end cap bearings 50 with couplers 52 configured to be operatively attached to either longitudinal end 46 of the vanes 44 in any suitable way sufficient to operatively attach to the receiver 48 of the vane 44. By way of non-limiting example, cammed end cap bearings 50A could be disposed at both longitudinal ends 46 of the vanes 44. Similarly, the braces 132 and/or protrusions 134 could be configured in a number of different ways, with or without the use of discrete tongues 144 or detents 142. Furthermore, the receiver 48 of the vanes 44 could be realized in a number of different ways without departing from the scope of the present invention. By way of non-limiting example, the vanes 44 could employ a solid cross-section without hollows 86 extending between the longitudinal ends 46, and one or more holes or pockets could be drilled into the longitudinal ends 46 of the vanes 44 to serve as the receiver 48. Moreover, while the couplers 52 are configured to engage the receivers 48 in a resilient lock-and-detent configuration, those having ordinary skill in the art will appreciate that the end cap bearings 50 could be operatively attached to the longitudinal ends 46 of the vanes 44 in any suitable way after the vanes 44 have been extruded. By way of non-limiting example, the end cap bearings 50 could be chemically bonded, adhered, mechanically linked, attached, or ultrasonically-welded to the longitudinal ends 46 of the vanes 44.

Figure 12:
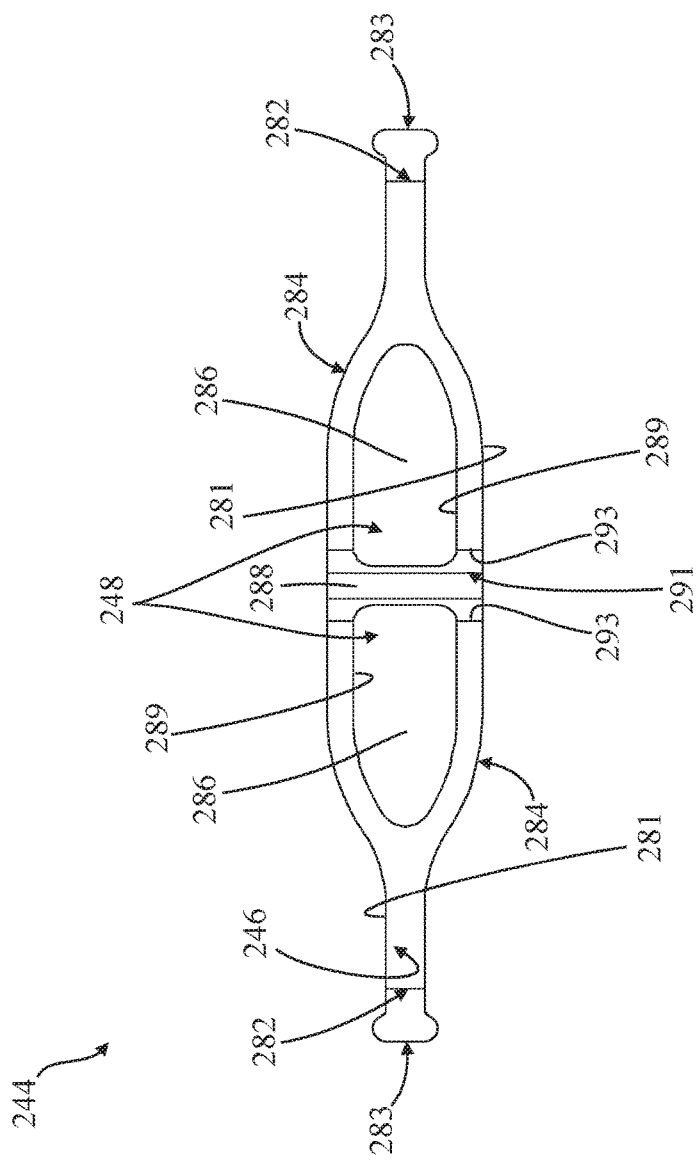
FIG. 12 is a front-side view of a vane according to another embodiment of the present invention.
Figure 13:
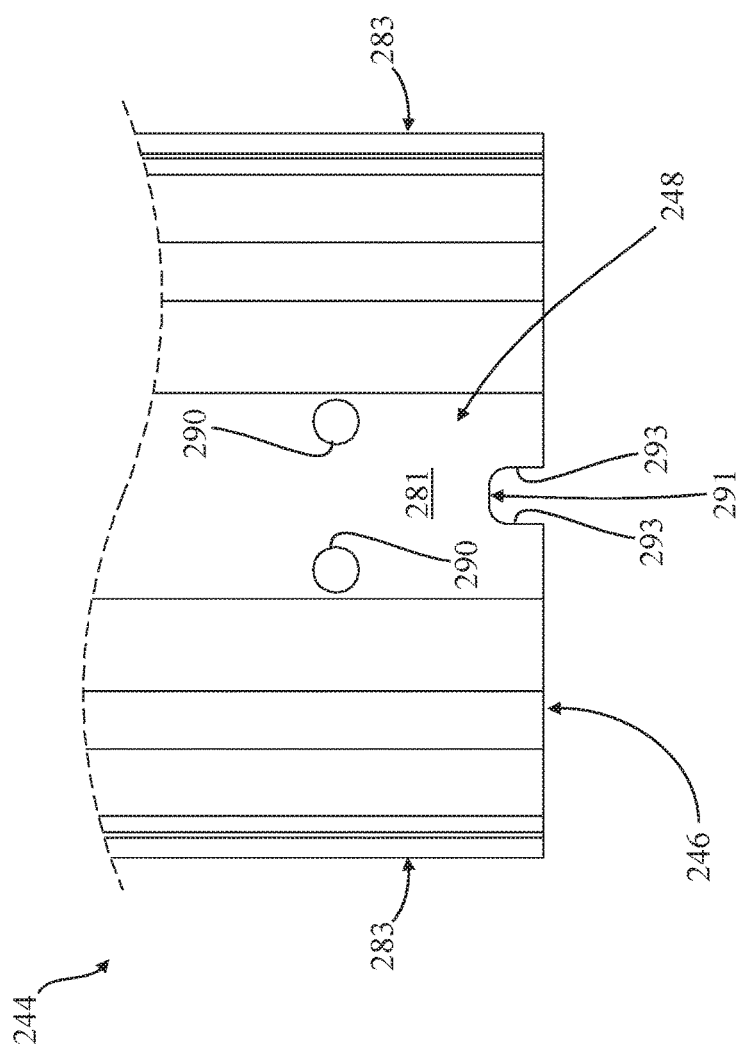
FIG. 13 is a partial top-side view of the vane of FIG. 12.

As noted above, a second embodiment of the vane is shown in FIGS. 12 and 13. As will be appreciated from the subsequent description below, the second embodiment of the vane is substantially similar to the first embodiment of the vane 44 described above in connection with FIGS. 7, 8, and 11. Thus, in the description that follows, the structure and components of the second embodiment of the vane that are the same as or that otherwise correspond to the structure and components of the first embodiment of the vane 44 are provided with the same reference numerals increased by 200. Moreover, for the purposes of clarity and consistency, only the specific differences between the first embodiment of the vane 44 and the second embodiment of the vane will be described in detail.

Referring now to FIGS. 12 and 13, a second embodiment of a vane for use with the active grill shutter 28 is generally shown at 244. Here too, as depicted in FIG. 12, the vane 244 extends between longitudinal ends 246 and employs receivers 248 at each longitudinal end 246. To this end, the receivers 248 may similarly include one or more hollows 286 spaced from the outer surface 281 and defining the inner surface 289 (or, more specifically, two inner surfaces 289 separated by the bridge 288). Here too, retention holes 290 extend from the outer surface 281 into communication with the hollows 286. Moreover, the second embodiment of the vane 244 is likewise provided with opposing leading edge portions 282 and also with camber surface portions 284. Here, the camber surface portions 284 of the second embodiment of the vane 244 are shaped differently than the camber surface portions 284 of the first embodiment of the vane 44 (compare FIG. 12 to FIG. 11).

Furthermore, in the second embodiment of the vane 244, seal portions 283 are operatively attached to each of the leading edge portions 282. The seal portions 283 are shaped and/or arranged such that at least one of the seal portions 283 of at least one of the vanes 244 abuts at least a portion of the frame 30 to limit airflow through the opening 38 in operation. The seal portions 283 may also be configured and/or arranged so as to dampen, minimize, or otherwise reduce noise (for example, "rattling") during operation. In some embodiments, such as where a plurality of vanes 244 are employed in the shutter assembly 60, the seal portions 283 of one vane may abut a portion of an adjacent vane 244 to limit airflow through the opening 38. The seal portions 283 have a generally T-shaped profile and are formed integrally with the vane 244, such as via a co-extrusion process. In one embodiment, the seal portions 283 are manufactured from a different material than the portion of the vane 244 which defines the receiver 248. By way of non-limiting example, the seal portions 283 could be manufactured from a material which is relatively soft, such as a rubber. However, those having ordinary skill in the art will appreciate that the seal portion 283 could be manufactured from any suitable material, with any suitable arrangement, shape, and/or configuration. Moreover, while the vane 244 is shown as having relatively symmetric seal portions 283, those having ordinary skill in the art will appreciate that differently shaped and/or configured seal portions 283 could be provided at each respective leading edge portion 282 of the vane 244.

As is best shown in FIG. 13, in the second embodiment of the vane 244, the receiver 248 further includes a notch 291 formed at the longitudinal end 246. Here, the notch 291 has a generally U-shaped profile and defines at least one notch surface 293. It will be appreciated that the notch surface 293 could be defined by a curved surface, a linear surface, and the like which can be either discretely defined or congruent with another surface. In the representative embodiment illustrated herein, the notch 291 is shaped such that the notch surface 293 has linear surfaces and rounded surfaces extending congruently therebetween. The notch 291 and the notch surface 293 cooperate with a second embodiment of the end cap bearing as described below. In the second embodiment of the vane 244 illustrated in FIGS. 12 and 13, two notches 291 are provided at each longitudinal end 246 of the vane 244. While both notches 291 at each longitudinal end 246 are similarly sized and shaped, those having ordinary skill in the art will appreciate that either notch 291 could have any suitable profile.

Figure 14:
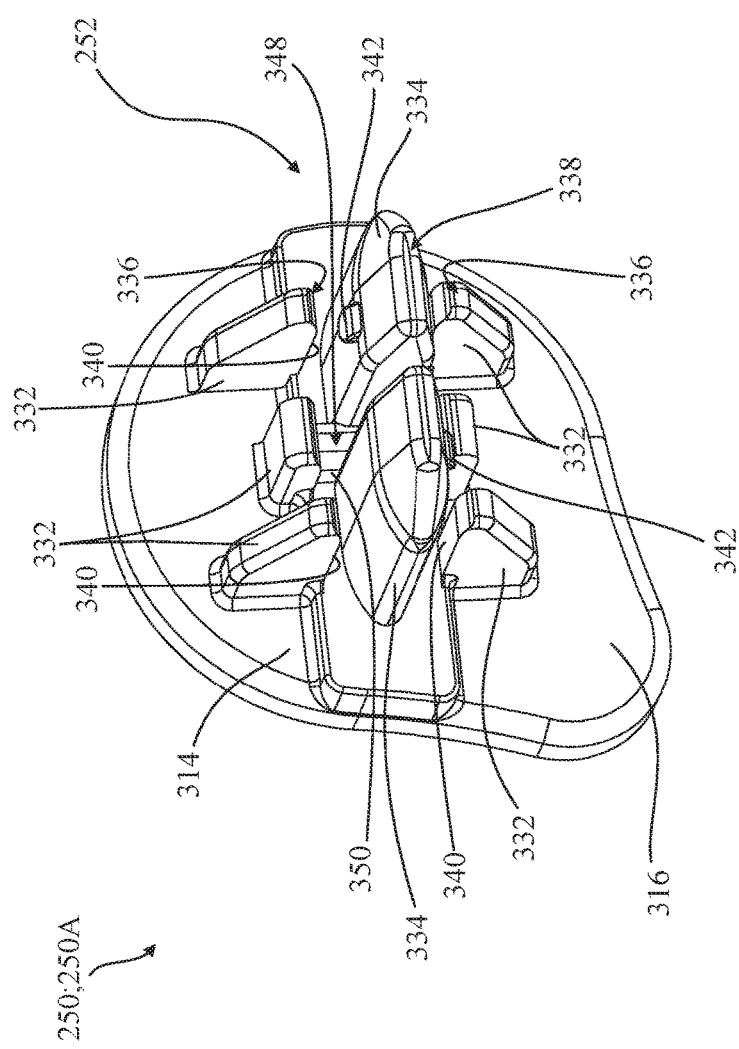
FIG. 14 is perspective view of a cammed end cap bearing for use with the vane of FIGS. 12-13.
Figure 15:
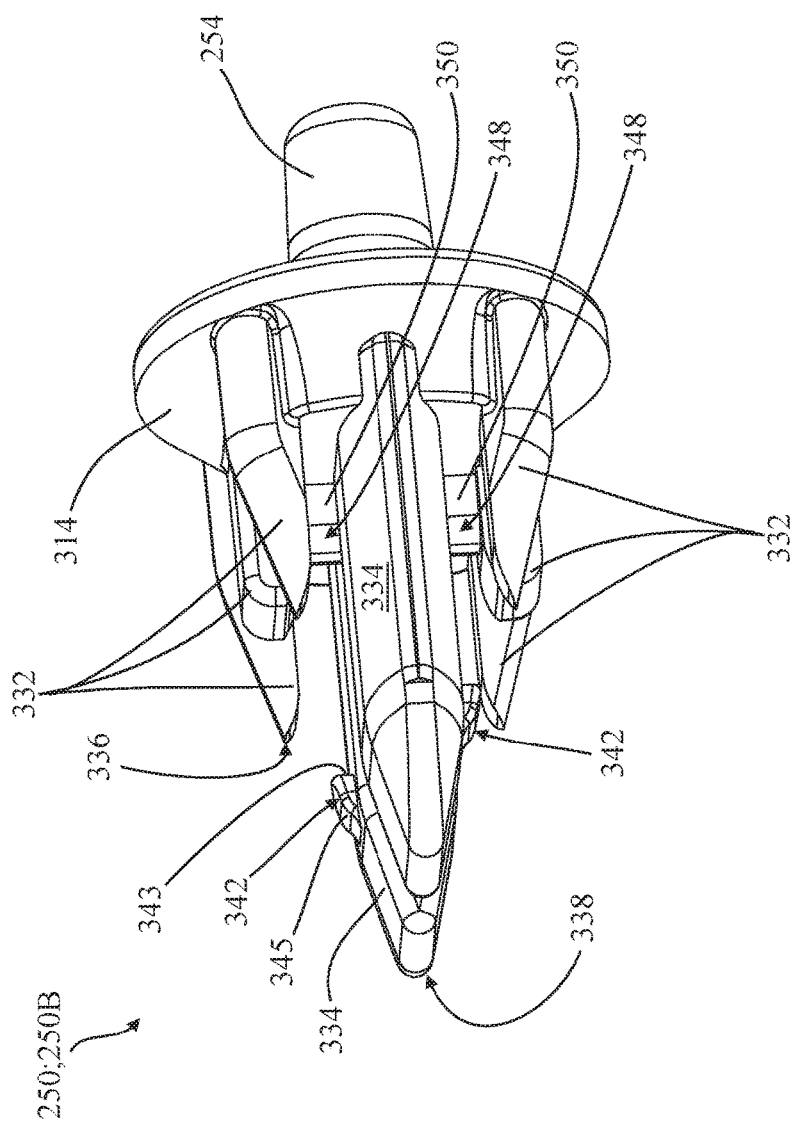
FIG. 15 is a perspective view of an uncammed end cap bearing for use with the vane of FIGS. 12-13.

As noted above, a second embodiment of the end cap bearing is shown in FIGS. 14 and 15 which is configured to engage the second embodiment of the vane 244 described above. As will be appreciated from the subsequent description below, the second embodiment of the end cap bearing is substantially similar to the first embodiment of the end cap bearing 50 described above in connection with FIGS. 7-10. Thus, in the description that follows, the structure and components of the second embodiment of the end cap bearing that are the same as or that otherwise correspond to the structure and components of the first embodiment of the end cap bearing 50 are provided with the same reference numerals increased by 200. Moreover, for the purposes of clarity and consistency, only the specific differences between the first embodiment of the end cap bearing 50 and the second embodiment of the end cap bearing will be described in detail.

Referring now to FIGS. 14 and 15, a second embodiment of an end cap bearing for use with the active grill shutter 28 is generally shown at 250. More specifically, a second embodiment of a cammed end cap bearing 250A is shown in FIG. 14, and a second embodiment of an uncammed end cap bearing 250B is shown in FIG. 15. Here, both end cap bearings 250 illustrated in FIGS. 14-15 are provided with couplers 252 which are each configured to attach to the receiver 248 of the second embodiment of the vane 244 described above in connection with FIGS. 12-13. To this end, the couplers 252 of both the cammed end cap bearing 250A shown in FIG. 14, and the uncammed end cap bearing 250B shown in FIG. 15, are provided with shafts 254 adapted to be rotatably received in bearing bores 34, 42 which extend to hubs 314. Here, the couplers 252 of the end cap bearings 250 each include six braces 332 which extend from the hub 314 to respective brace ends 336 and which each define a respective support surface 340 for engagement with the outer surface 281 of the vane 244. Further, the couplers 252 of the end cap bearings 250 each have two protrusions 334 which extend from the hub 314 to respective protrusion ends 338.

Each of the protrusions 334 is similarly provided with a respective detent formation 342 shaped and arranged for engagement within one of the retention holes 290 of the vane 244. While the couplers 52 of the first embodiment of the end cap bearings 50 have detent formations 142 with generally round, filleted profiles, as described above in connection with FIGS. 9 and 10, the couplers 252 of the second embodiment of the end cap bearings 250 have detent formations 342 with an elongated rounded profile which tapers towards the protrusion end 338. Here, as best shown in FIG. 15, the detent formations 342 are defined by a rounded abutment edge 343 which is shaped to engage the retention hole 290, and a ramp edge 345 arranged between the abutment edge 343 and the protrusion end 338. It will be appreciated that this configuration helps facilitate installation of the coupler 252 into the receiver 248, whereby engagement of the ramp edge 345 with the inner surface 289 of the vane 244 helps resiliently deflect the vane 244 away from the protrusion 334, as described in greater detail above in connection with the first embodiment. However, those having ordinary skill in the art will appreciate that the detent formations 342 could similarly be provided with any suitable profile, shape, or arrangement sufficient to retain the coupler 252 to the receiver 248.

The couplers 252 of the second embodiment of the end cap bearing 250 are also each provided with a key 348 shaped for engagement with the notch 291 of the vane 244 described above. More specifically, the key 348 defines a key surface 350 arranged to abut the notch surface 293 of the notch 291 when the end cap bearing 250 is secured to the vane 244. Here, the key 348 has a generally rounded-rectangular profile which is complimentary to the U-shaped profile of the notch 291. As shown in FIGS. 14 and 15, the end cap bearings 250 are provided with couplers 252 which each include a pair of keys 348 which are shaped and arranged to engage the corresponding pair of notches 291 at each respective longitudinal end 246 of the vane 244, as described above.

In operation, when the vehicle 20 is being driven, airflow impinges upon the active grille shutter 28. The actuator 58, which may be driven or otherwise selectively controlled via an electronic controller (not shown), rotates the splined driveshaft 128 of the end cap bearing 50, 250 which, in turn, effects concurrent rotation of the vanes 44, 244 within the opening 38 via the linkage 56, as described above. The vanes 44, 244 may be moved to a fully closed position, a fully open position, or to one of multiple positions therebetween. Moreover, the vanes 44, 244 may be moved to different rotational positions during or between different predetermined vehicle 20 operating conditions. By way of non-limiting example, the vanes 44, 244 could be rotated to a fully closed position as the vehicle 20 travels at speed so as to reduce aerodynamic drag. Similarly, the vanes 44, 244 could be rotated to a fully opened position during a so-called "hot idle" condition, or after the vehicle 20 has been shut off, whereby an electric fan (not shown, but generally known in the art) could be employed to remove heat from the engine bay of the vehicle 20. By way of further non-limiting example, the vanes 44, 244 could be rotated to a fully closed position during a so-called "cold start" operating condition so as to help the vehicle 20 engine warm up quickly, thereby reducing fuel consumption and contributing to improved emissions.

In this way, the active grille shutter 28 and the shutter subassemblies 55 described herein contribute to significantly reduced manufacturing expense while, at the same time, affording opportunities for improved durability, strength, and functionality in use. Specifically, those having ordinary skill in the art will appreciate that the vanes 44, 244 can be manufactured using significantly less material than is otherwise afforded using conventional methods, with manufacturing tooling and processes that contribute to lower component cost, weight, and manufacturing/assembly complexity. Moreover, it will be appreciated that the length of the vanes 44, 244 can be readily changed or adjusted to accommodate a number of different vehicle 20 applications without a significant increase in manufacturing expense and without necessitating the creation of new tooling for different applications. Furthermore, those having ordinary skill in the art will appreciate that the modular configuration of the shutter assembly 60 enables installation into the frame 30 with relative ease while, at the same time, ensuring that the vanes 44, 244 are properly biased while maintaining durable, reliable, and noise-free performance under a number of different vehicle 20 and/or heat exchanger 22 operating conditions.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. An active grille shutter for use in regulating airflow towards a heat exchanger of a vehicle, said active grille shutter comprising:
   a frame adapted to be disposed adjacent to the heat exchanger of the vehicle, said frame having a first mount with a first plurality of bearing bores, a second mount spaced from said first mount, and at least one opening arranged between said mounts to allow air to pass through said opening towards the heat exchanger of the vehicle;
   an end cap arranged to secure to said second mount of said frame, said end cap having a second plurality of bearing bores;
   a plurality of vanes each extending across said opening between opposing longitudinal ends with a receiver formed at each of said longitudinal ends of each of said vanes;
   an end cap bearing operatively attached to each of said longitudinal ends of each of said vanes, each of said end cap bearings having: a shaft arranged to be rotatably received by one of said bearing bores, and a coupler extending away from said shaft shaped to secure to one of said receivers of one of said vanes for concurrent movement; said couplers of each of said end cap bearings including a protrusion extending away from said shaft to a protrusion end and a resiliently flexible tongue extending from said protrusion end to a tongue end; said receivers of each of said vanes have an outer surface and a hollow spaced from said outer surface shaped to receive at least a portion of said protrusion and further include a retention hole extending from said outer surface into communication with said hollow; said couplers of each of said end cap bearings include a detent formation shaped to engage said retention hole; and said detent formation is arranged between said protrusion end and said tongue end;
   a linkage interconnecting said vanes adjacent to one of said longitudinal ends such that said vanes rotate concurrently; and
   and actuator disposed in torque-translating relationship with at least one of said end cap bearings such that rotation of said actuator is imparted to each of said vanes via said linkage to concurrently rotate each of said vanes within said opening so as to regulate airflow through said opening towards the heat exchanger of the vehicle.

2. The active grill shutter as set forth in claim 1, wherein said hollow defines an inner surface of said vane, and wherein said protrusion is shaped to engage at least a portion of said inner surface.

3. The active grill shutter as set forth in claim 1, wherein said receivers of each of said vanes include a pair of hollows spaced from each other by a bridge; and wherein said couplers of each of said end cap bearings include a pair of protrusions shaped for engagement within one of said pair of hollows.

4. The active grill shutter as set forth in claim 1, wherein said detent formation is formed on said protrusion.

5. The active grill shutter as set forth in claim 1, wherein said detent formation is arranged between said protrusion end and said shaft.

6. The active grill shutter as set forth in claim 1, wherein said hollow defines an inner surface of said vane; and wherein said vanes are shaped to at least partially deflect away from said protrusion in response to engagement between said detent formation and said inner surface and to resiliently return towards said protrusion when said detent formation engages said retention hole.

7. The active grill shutter as set forth in claim 1, wherein said receivers of each of said vanes have an outer surface; and wherein said couplers of each of said end cap bearings include a brace extending away from said shaft and defining a support surface abutting said outer surface.

8. The active grill shutter as set forth in claim 7, wherein said couplers of each of said end cap bearings include a pair or braces each defining a support surface abutting said outer surface.

9. The active grill shutter as set forth in claim 1, wherein said receivers of each of said vanes include a notch formed at said longitudinal end defining at least one notch surface; and wherein said couplers of each of said end cap bearings include a key defining a key surface abutting said notch surface.

10. The active grill shutter as set forth in claim 1, wherein each of said vanes each have a pair of opposing leading edge portions; wherein each of said vanes includes a seal portion operatively attached to each of said leading edge portions; and wherein at least one of said seal portions is shaped to abut at least a portion of said frame to limit airflow through the opening.

11. A shutter subassembly for use in an active grille shutter arranged to regulate airflow through an opening towards a heat exchanger of a vehicle, the active grille shutter having a frame and a pair of mounts arranged on opposing sides of the opening with each of the mounts defining a respective bearing bore, said shutter subassembly comprising:

a vane extending between opposing longitudinal ends with a receiver formed at each of said longitudinal ends;

a pair of end cap bearings each having a coupler shaped to engage one of said receivers of said vane so as to secure said end cap bearing to said vane for concurrent movement, and a shaft extending away from said coupler and arranged for rotatable engagement with one of the bearing bores of the active grill shutter;

said couplers of each of said end cap bearings include a protrusion extending away from said shaft to a protrusion end; said receivers of said vane each have an outer surface and a hollow spaced from said outer surface shaped to receive at least a portion of said protrusion;

said receivers of said vane each further include a retention hole extending from said outer surface into communication with said hollow; and said couplers of each of said end cap bearings include a detent formation shaped to engage said retention hole; and wherein said couplers of each of said end cap bearings further include a resiliently flexible tongue extending from said protrusion end to a tongue end; and wherein said detent formation is arranged between said protrusion end and said tongue end.

12. The shutter subassembly as set forth in claim 11, wherein said hollow defines an inner surface of said vane; and wherein said vane is shaped to at least partially deflect away from said protrusion in response to engagement between said detent formation and said inner surface and to resiliently return towards said protrusion when said detent formation engages said retention hole.

13. The shutter subassembly as set forth in claim 11, wherein said receivers of said vane each include a notch formed at said longitudinal end defining at least one notch surface; and wherein said couplers of each of said end cap bearings include a key defining a key surface abutting said notch surface.

14. The shutter subassembly as set forth in claim 11, wherein said vane has a pair of opposing leading edge portions; wherein said vane includes a seal portion operatively attached to each of said leading edge portions; and wherein at least one of said seal portions is shaped to abut at least a portion of the frame to limit airflow through the opening.

* * * * *